(12) United States Patent
Tanaka et al.

(10) Patent No.: US 8,724,143 B2
(45) Date of Patent: May 13, 2014

(54) IMAGE COMMUNICATING APPARATUS

(75) Inventors: Tatsuyuki Tanaka, Kanagawa (JP); Hirotaka Kawabata, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 829 days.

(21) Appl. No.: 12/762,593

(22) Filed: Apr. 19, 2010

(65) Prior Publication Data

US 2011/0080610 A1    Apr. 7, 2011

(30) Foreign Application Priority Data

Oct. 2, 2009  (JP) ................. 2009-230562

(51) Int. Cl.
*H04N 1/00* (2006.01)
(52) U.S. Cl.
USPC ......................................... 358/1.15; 358/400
(58) Field of Classification Search
None
See application file for complete search history.

(56) References Cited

U.S. PATENT DOCUMENTS 6,553,515 B1 * 4/2003 Gross et al. ................. 714/47.2
2004/0001224 A1 * 1/2004 Kajiwara ..................... 358/1.15

FOREIGN PATENT DOCUMENTS

| CN | A-1399445 | 2/2003 |
| JP | A-2002-368824 | 12/2002 |
| JP | A-2005-94213 | 4/2005 |
| JP | A-2009-89262 | 4/2009 |

OTHER PUBLICATIONS

Notification of Reasons for Refusal dated Mar. 19, 2013 from Japanese Patent Application No. 2009-230562 (with English-language translation).
Dec. 12, 2013 Office Action in Chinese Patent Application No. 201010177962 (with translation).

* cited by examiner

*Primary Examiner* — Firmin Backer
*Assistant Examiner* — Lennin Rodriguezgonzalez
(74) *Attorney, Agent, or Firm* — Oliff PLC

(57) ABSTRACT

An image communicating apparatus includes: a communicating control unit that controls an internet facsimile communication for transmitting/receiving control information and a packet containing image information based on a T.38 protocol; a loss detecting unit that detects a loss of the packet transmitted from a transmitting side in a stage for receiving the image information through the packet based on the T.38 protocol; a complementing information holding unit that holds complementing information for complementing the image information contained in the lost packet; and a complementation processing unit that complements the image information contained in the lost packet with the complementing information held by the complementing information holding unit if the loss of the packet is detected by the loss detecting unit.

5 Claims, 13 Drawing Sheets

FIG. 12

| COMMUNICATION INTERRUPTING HISTORY MANAGING TABLE ||| 1161 |
|---|---|---|
| DATE AND TIME OF OCCURRENCE | COMMUNICATING PARTNER (IP ADDRESS) | NUMBER OF TIMES OF INTERRUPTION OCCURRENCE |
| 2009-09/07 13:00:00 | 172.22.224.3 | 1 |
| 2009-09/08 10:30:00 | 172.22.228.5 | 3 |
| ⋮ | ⋮ | ⋮ |

IMAGE COMMUNICATING APPARATUS

CROSS-REFERENCE TO RELATED APPLICATION

This application is based on and claims priority under 35 USC 119 from Japanese Patent Application No. 2009-230562 filed on Oct. 2, 2009.

BACKGROUND

1. Technical Field

The present invention relates to an image communicating apparatus.

2. Related Art

In an existing facsimile communication through a G3 (Group3 Facsimile) machine, a decision of a transmission error line is made if the number of conversion dots between EOLs (End Of Line) is not coincident with the number of dots determined by T.4 at a receiving side, and RTP (Real Time Protocol) or RTN (Retrain Negative) is sent when the transmission error line is counted so that a threshold is exceeded. If data to be transmitted are lost or a data change is caused by a short break or a noise, an inaccuracy of the number of dots between the EOLs occurs. For this reason, it is possible to make a detection of a transmission line.

Even if the data loss or data change is caused continuously for a certain period so that data corresponding to several lines cannot be received normally, moreover, a probability that start and end parts of a data abnormality will be exactly applied to a break of the line is low on a probability theory basis. Therefore, it is possible to make a detection of an error of at least one or two lines in front and rear parts.

On the other hand, with a spread of internet, there is realized a facsimile communication via an IP network for putting a facsimile signal (including image information) on an IP (Internet Protocol) packet using a protocol referred to as IFP (Internet Facsimile Protocol) and transferring them in a real time based on a T.38 method (a real time transferring method) recommended by ITU-T(International Telecommunication Union Telecommunication Standardization Sector).

In the facsimile communication using the IP network based on the T.38 method, it is supposed that a method of carrying out packeting every line or several lines and transmitting the packet in a non-ECM (Error Correction Mode) communication is a mainstream. In the packet transmitting method, however, data are lost (or cancelled) on a packet unit over the IP network in many cases. When the loss of the packet occurs during a receipt of image information, the image information is extracted clearly in an exact break of the line. As a result, even if the data are lost, it is impossible to carry out counting for a transmission error line.

In the case in which a communication is continuously carried out even if the packet is lost, there is the following possibility as a result. More specifically, although a received image has a lack so that a length of the image in a secondary scanning direction is small, a result of the receipt is obtained as a normal end. For this reason, it is impossible to recognize that an information transmission between users has a lack, resulting in troubles (a misrecognition).

SUMMARY

According to an aspect of the invention, an image communicating apparatus comprising: a communicating control unit that controls an internet facsimile communication for transmitting/receiving control information and a packet containing image information based on a T.38 protocol; a loss detecting unit that detects a loss of the packet transmitted from a transmitting side in a stage for receiving the image information through the packet based on the T.38 protocol; a complementing information holding unit that holds complementing information for complementing the image information contained in the lost packet; and a complementation processing unit that complements the image information contained in the lost packet with the complementing information held by the complementing information holding unit if the loss of the packet is detected by the loss detecting unit.

BRIEF DESCRIPTION OF THE DRAWINGS

Embodiments of the invention will be described in detail based on the following figures, wherein:

FIG. 12 is a table showing a structure of a communication interrupting history managing table according to the fourth example.

DETAILED DESCRIPTION

An embodiment according to the invention will be described below in detail with reference to the accompanying drawings.

Figure 1:
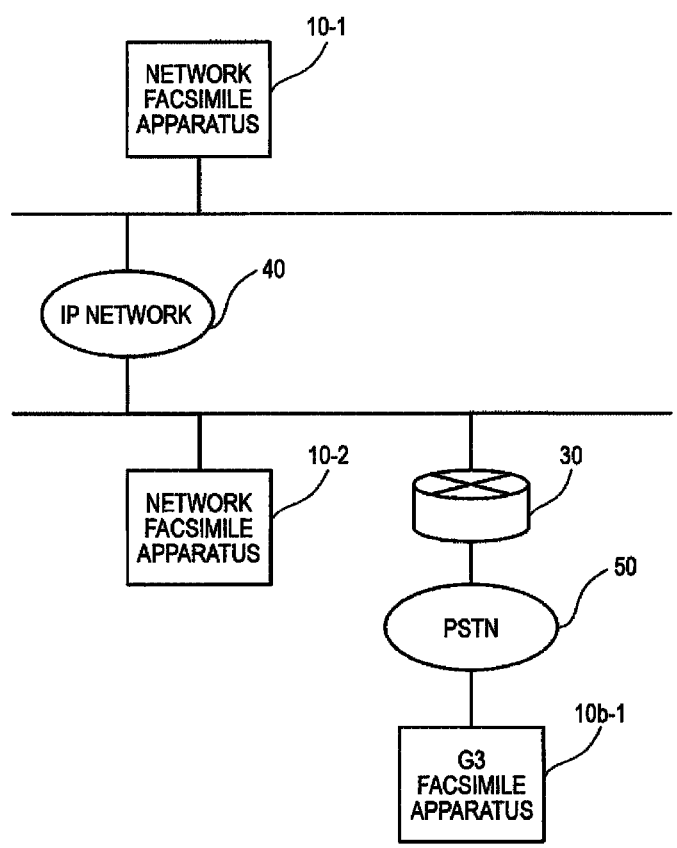
FIG. 1 is a conceptual diagram showing a whole structure of a facsimile communication network according to an embodiment.

FIG. 1 is a conceptual diagram showing a whole structure of a facsimile communication network according to the embodiment.

In the facsimile communication network, internet facsimile apparatuses (hereinafter referred to as facsimile apparatuses) 10-1 and 10-2 are connected to each other through an IP network 40, and furthermore, the IP network 40 and a public network (PSTN: Public Switched Telephone Network) 50 for accommodating a G3 facsimile apparatus 10b-1 are connected to each other through a T.38 gateway apparatus (hereinafter referred to as a gateway apparatus) 30.

In the facsimile communication network shown in FIG. 1, the facsimile apparatuses 10-1 and 10-2 carry out a facsimile communication via the IP network 40 by using an IFP packet through IFP having a T.38 method.

Moreover, the G3 facsimile apparatus 10b-1 may carry out a facsimile communication through the IFP packet having the T.38 method together with the IP network 40 through the gateway apparatus 30 having a function for converting a G3 facsimile signal transferred through the public network 50 into a message defined by the T.38.

Figure 2:
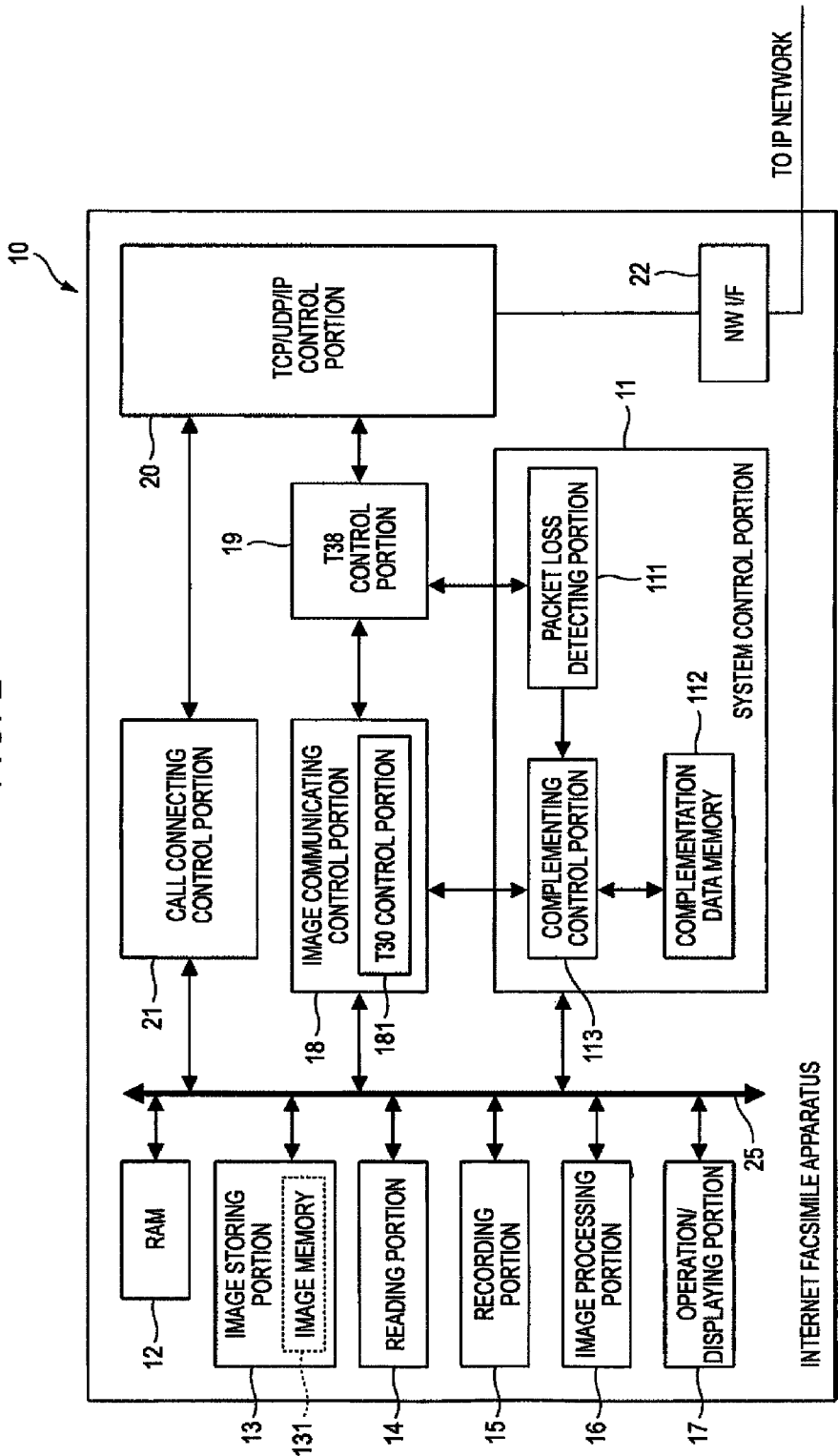
FIG. 2 is a block diagram showing a functional structure of a facsimile apparatus according to the embodiment.

FIG. 2 is a block diagram showing a functional structure of a facsimile apparatus 10 (corresponding to the facsimile apparatuses 10-1 and 10-2 in FIG. 1) according to the embodiment.

The facsimile apparatus 10 includes a system control portion 11 having a CPU (central processing unit) and an ROM (Read-Only Memory) and serving to carry out a control processing for the whole apparatus based on a control program stored in the ROM, an RAM (Random Access Memory) 12 serving as a work area (which stores system data for controlling an operation of the apparatus and various information) which is used by the control program, an image storing portion 13 for storing image data received from a network (the IP network 40) or image data read by a reading portion 14 which will be described below, the reading portion 14 for reading an image of a transmitted document or a copied document in a predetermined resolution, a recording portion 15 for recording and outputting the received image data or the read image data which are stored in the image storing portion 13 onto a recording paper in a predetermined resolution, an image processing portion 16 for carrying out an image processing such as coding, decoding, enlargement or reduction for the image data in a transmission and receipt of the image data, an operating/displaying portion 17 which is constituted by a touch panel and serves to carry out various operations (a calling operation) for operating the apparatus by a user and to display various information, a image communicating control portion 18 for carrying out a processing such as a resolution conversion, a paper size conversion or a coding rule conversion for image data corresponding to a capability of a partner in a transmission of the image data, a T30 control portion 181 contained in the image communicating control portion 18 and serving to control a T.30 facsimile protocol recommended by ITU-T, a T38 control portion 19 for controlling a T38 protocol recommended by the ITU-T, a TCP/UDP/IP control portion 20 for controlling a protocol of a network layer/transport layer of internet [an IP protocol/TCP (Transmission Control Protocol)/UDP (User Datagram Protocol) protocols for controlling a communication with the IP network 40], a call connecting control portion 21 having a control function such as an H.323 or SIP (Session Initiation Protocol) protocol and serving to carry out a session connecting control in point-to-point through the internet, and a network interface (network I/F) 22 having a communicating control function of a data link layer and subsequent layers and serving to carry out a connection to the IP network 40 through LAN (Local Area Network).

In the facsimile apparatus 10, for example, when a session with a partner terminal is established by a control of the call connecting control portion 21 based on a dial calling operation through the operating/displaying portion 17 and image data are then transmitted to the partner terminal through the IP network 40, transmitting image data stored in the image storing portion 13 are transferred to the image communicating control portion 18.

The image communicating control portion 18 carries out the processing such as the resolution conversion, the paper size conversion or the coding rule conversion over the image data transferred from the image storing portion 13 corresponding to a capability of the partner terminal, and transfers the image data thus processed to the T30 control portion 181.

The T30 control portion 181 transfers the image data from the image communicating control portion 18 to the T38 control portion 19 in accordance with the T.30 protocol.

Upon receipt of the image data from the T30 control portion 181, the T38 control portion 19 puts the image data on an IFP packet by using IFP recommended by T.38 and transfers them to the TCP/UDP/IP control portion 20.

The TCP/UDP/IP control portion 20 puts the IFP packet sent from the T38 control portion 19 on a TCP or UDP protocol and transfers them to the IP network 40 through the network I/F 22.

In a receipt of the image data in accordance with a procedure of the T.38 method, moreover, the TCP/UDP/IP control portion 20 receives, through the network I/F 22, the IFP packet put on the TCP or UDP protocol and transmitted from the partner terminal via the IP network 40.

Subsequently, the TCP/UDP/IP control portion 20 transmits the IFP packet to the T38 control portion 19 by using the IFP.

The T38 control portion 19 fetches the image data from the IFP packet transmitted from the TCP/UDP/IP control portion 20 and transfers the image data to the T30 control portion 181.

The T30 control portion 181 transmits the image data from the T38 control portion 19 to the image communicating control portion 18 in accordance with the T.30 protocol.

The image communicating control portion 18 stores, in the image storing portion 13, the image data transmitted from the T30 control portion 181.

The image data stored in the image storing portion 13 are transmitted to the recording portion 15 and are recorded and discharged.

In the facsimile apparatus 10, when carrying out a facsimile communication in a real time by using the T.38 protocol (TFP), thus, the image communicating control portion 18, the T30 control portion 181, the T38 control portion 19 and the TCP/UDP/IP control portion 20 execute a signal processing for putting a facsimile signal for control information or image data on the T.38 packet (IFP packet) and relaying in the IP network 40.

Figure 3:
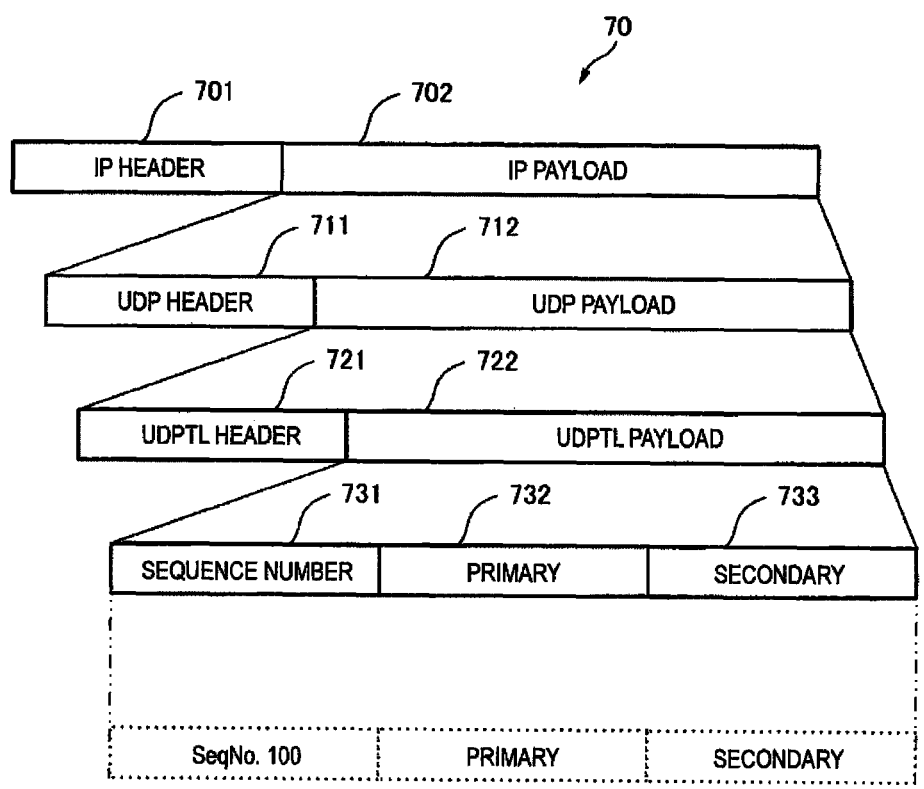
FIG. 3 is a diagram showing a structure of an IFP packet to be used in an internet facsimile communication.

FIG. 3 is a diagram showing a structure of an IFP packet 70 to be used for the facsimile communication in the IP network 40 (an example of the case in which UDP is used).

As shown in FIG. 3, the IFP packet 70 wholly includes an IP header portion 701 and an IP payload portion 702. The IP payload portion 702 is constituted by a UDP (UDP (User Datagram Protocol)) header portion 711 and a UDP payload portion 712.

The UDP payload portion 712 further includes a UDPTL (Facsimile UDP transport Layer) header portion 721 and a UDPTL payload portion 722. The UDPTL payload portion 722 is constituted by a sequence number, and primary and secondary areas 731, 732 and 733.

In the facsimile apparatus 10 according to the embodiment, when making a transition to a procedure for transmitting image data in an operation on a transmitting (calling) side, image data on a line unit are put (contained) on the UDPTL payload portion 722 and are transmitted to the partner terminal, for example.

In that case, a continuous sequence number assigned every transmitting packet within a single FAX communication is put (contained) in the sequence number area 731 of the UDPTL payload portion 722 and image data for each line (one line or plural of lines) corresponding to the sequence number are put in the primary area 732.

Furthermore, the secondary area 733 is to be added as a redundant structure, and image data in a previous line to a line to be put in the primary area 732 (a last transmitting line: a line having a last sequence number) are put therein, for example.

On the other hand, in an operation on a receiving (incoming) side, the IFP packet (hereinafter referred to as a packet) transmitted from the partner terminal is received to check the sequence number in the UDPTL payload portion 722, and at the same time, the image data contained in the primary area 732 are decoded and the decoded image data are linked and stored in order of the sequence number over an image memory 131 provided in the image storing portion 13 to build the received image data, for example.

In that case, the sequence number to be added before the primary area 732 of the UDPTL payload portion 722 is utilized as index information for detecting whether a packet to be received may be received or may not be received (is lost).

Figure 4:
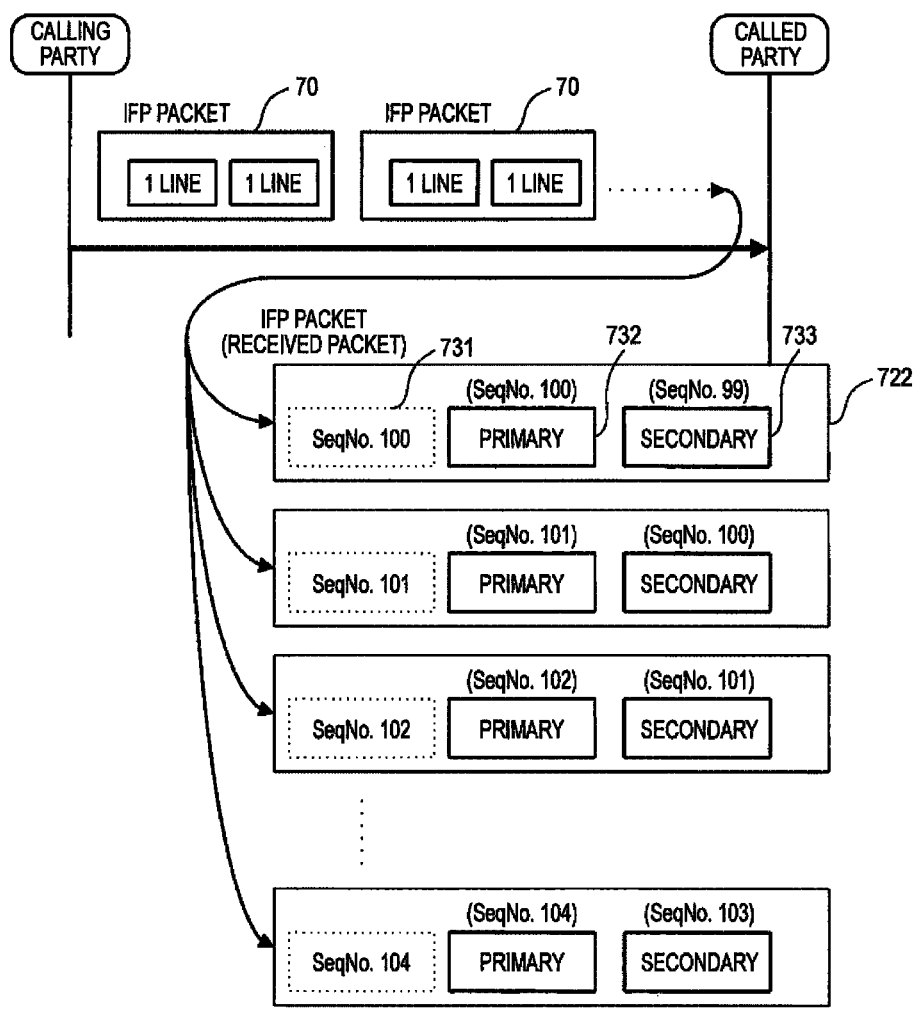
FIG. 4 is a diagram showing a receipt processing image of the IFP packet.

FIG. 4 is a diagram showing a processing image (particularly, data in the UDPTL payload portion 722 are noted) in the case in which a packet (an IFP packet) transmitted from the partner terminal is received through a protocol (a control procedure) using the T.38 method in the facsimile apparatus 10.

As shown in FIG. 4, when a packet 70 containing image data on a line unit are transmitted from a transmitting side (a calling party), a sequence number (Seq No. 100, 101, 102 or the like) of the received packet 70 is checked every time the packet 70 transmitted from the transmitting side with the image data on the line unit contained therein is received, and the image data put in the primary area 732 of each received packet 70 are linked (coupled) in order of the sequence number to build received data as long as the continuous sequence numbers (Seq Nos. 100, 101, 102 and the like) are extracted (detected) at the receiving side (the called party).

On the other hand, in the case in which the continuous sequence number is not obtained, for example, the sequence number (Seq No. 104) is received after the sequence number (Seq No. 102), it is possible to detect that the packet 70 having a sequence number (Seq No. 103) which is missing (may not be extracted) is lost.

In respect of the recommendation of the T.38, a "redundant packet" (see the secondary 733) is defined in the UDPTL packet (see the UDPTL payload 722 in FIG. 3). In the case in which the "redundant packet" is valid, it is assumed that a loss which may not maintain a continuity of the sequence number is detected as a packet loss when the loss occurs even if the "redundant packet" is used.

In the case in which the packet loss is detected through the processing, a request for retransmitting a lost packet may be given to receive the same packet in a facsimile apparatus having an ECM function.

In the embodiment, however, an application in a non-ECM communication (a communication between machine types which do not support the ECM function) is assumed, and a receipt through the retransmission may not be expected.

On the other hand, the facsimile apparatus 10 according to the embodiment has a processing function for complementing data (image data) contained (included) in the lost packet in order to prevent a normal end from being caused in a state in which an image lack on a line unit occurs when the packet is lost.

In the ECM communication, in the case in which a packet (an ECM frame) may not be received, it is possible to receive only a part which does not succeed in the receipt again. In that case, however, it is necessary to carry out a communication (an additional communication) for performing the receipt again.

On the other hand, according to the embodiment in which the image data included in the lost packet are complemented in the non-ECM communication, there is an advantage that the additional communication is not required for the packet loss.

A packet-loss data complementation processing function according to the embodiment is implemented by a packet loss detecting portion 111, a complementation data memory 112 and a complementing control portion 113 which are provided in the system control portion 11 in a functional block shown in FIG. 2, for example.

After an establishment of a session with the partner terminal through a communication of a call connecting procedure signal, the packet loss detecting portion 111 extracts a peculiar serial number (sequence number) added to a received packet every time the packet transmitted from the transmitting side with image data contained therein is received, and detects that the packet is lost based on a result obtained by checking a continuity of the sequence number extracted from each received packet in an image data receiving procedure executing stage (phase).

The complementation data memory 112 is constituted by a nonvolatile memory and holds complementation data for complementing image data contained in a lost packet (image data to compensate for a corresponding line to the image data in the lost packet in the image memory 131 which is carrying out a storage).

In the case in which the packet loss is detected by the packet loss detecting portion 111, the complementing control portion 113 carries out a complementation processing over the lost packet with the complementation data held by the complementation data memory 112.

The detection of the packet loss and the packet-loss data complementing control function in the facsimile apparatus 10 according to the embodiment will be described in detail by taking each example.

FIRST EXAMPLE

A facsimile apparatus 10 according to a first example is constituted by the functional block shown in FIG. 2. In the system control portion 11, the complementation data memory 112 holds image data contained in a packet received normally in the past as complementation data for complementing image data contained in a lost packet, and the complementing control portion 113 carries out a complementation processing over the image data in the lost packet with the image data contained in the packet received normally.

Figure 5:
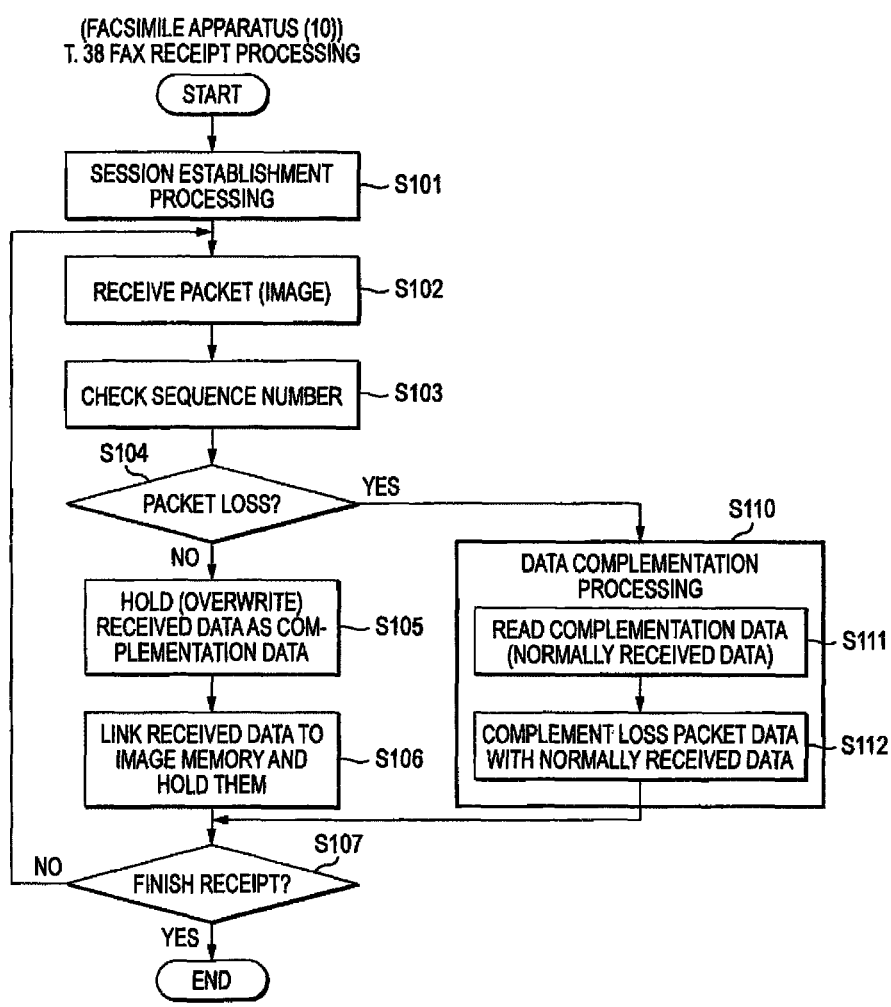
FIG. 5 is a flowchart showing a T.38 FAX receipt processing operation according to a first example.

FIG. 5 is a flowchart showing a facsimile (FAX) receiving operation based on a control procedure using a T.38 method in the facsimile apparatus 10 according to the example.

In the example, after establishing a session with a partner terminal (a calling party) through a calling set processing by a communication of a call connecting procedure signal using the T.38 method (Step S101), the facsimile apparatus 10 transmits/receives FAX protocol information of the T.38 method (not shown) and makes a transition to a phase for receiving the image data from the partner terminal. Every time a packet containing the image data is received (Step S102), consequently, the packet loss detecting portion 111 checks a sequence number (Step S103) and carries out a processing for detecting whether a packet loss is caused or not (Step S104).

If the packet loss is not detected (NO in the Step S104), the complementing control portion 113 stores, in the complementation data memory 112, the image data in the packet received normally (Step S105).

Subsequently, the image data received normally are stored in the image memory 131 in order of a sequence number (Step S106) and it is then monitored whether the receipt of the image is ended or not (Step S107).

If the receipt is not ended (NO in the Step S107), a next packet is received (S102) and the sequence number is checked, and it is detected whether a packet loss occurs or not in the meantime (Steps S103 and S104). If the packet is normally received (NO in the Step S104), there is continuously executed a processing for storing image data in the received packet in the complementation data memory 112 and storing the image data in the image memory 131 in order of the sequence number (Steps S105 and S106).

In the meantime, if the packet loss is detected based on a continuity check of a sequence number of a last received packet and a sequence number of a second last received packet as a result of the packet loss detection processing for each packet received at the Step S102 (YES in the Step S104), the complementing control portion 113 executes a data complementation processing (Step S110).

In the data complementation processing, the complementing control portion 113 reads complementation data stored in the complementation data memory 112 (image data in a normally received packet: normally received image data) (Step S111) and carries out a complementation with the normally received image data read corresponding to loss data in the image memory 131 (image data in the loss packet) (Step S112).

More specifically, there is carried out a processing for embedding the normally received image data in an area in which the loss data in the image memory 131 are to be put (at least one line), thereby eliminating an image lack.

Then, the processing proceeds to the Step S107. If it is decided that the receipt of the image is not ended (based on a non-receipt of a post message instruction) (NO in the Step S107), the processing in and after the Step S102 is executed. If it is decided that the receipt of the image is ended (YES in the Step S107), a serial FAX receipt processing is ended.

Figure 6:
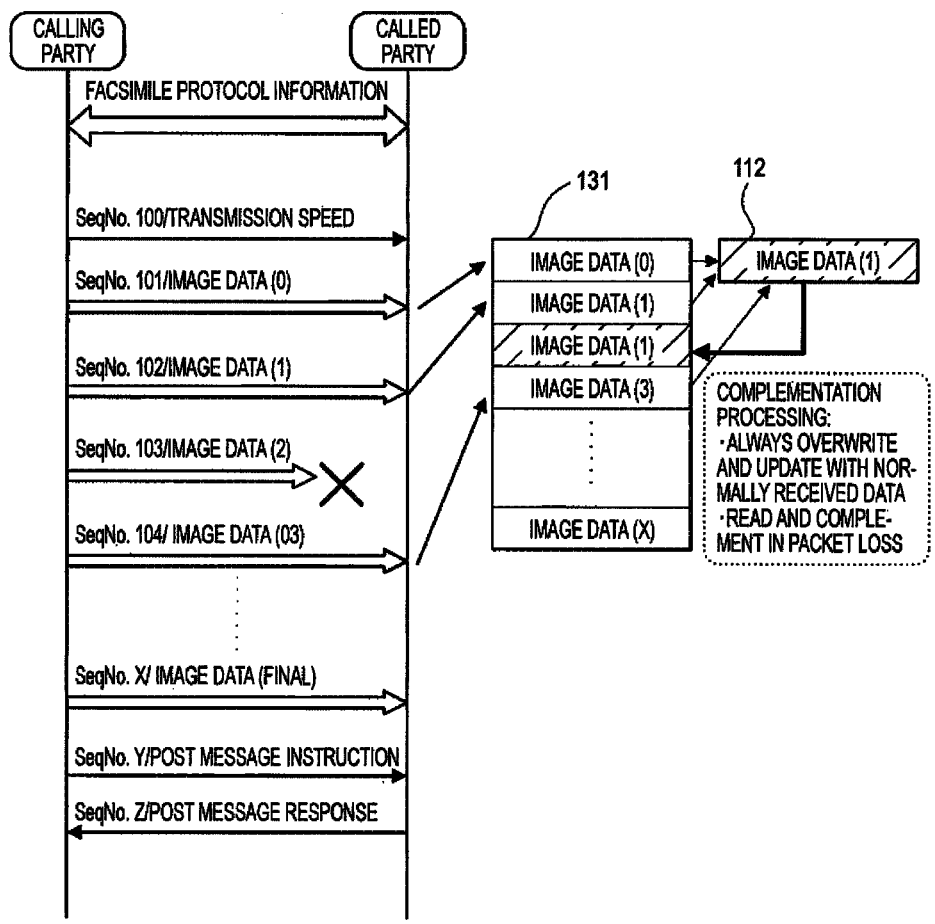
FIG. 6 is a diagram showing a data complementation processing image in a packet loss according to the first example.

FIG. 6 is a diagram showing a packet-loss data complementation processing image related to the control sequence of the facsimile apparatus 10 according to the example.

In FIG. 6, the FAX protocol information using the T.38 method is transferred between a calling party and an called party to send a transmission speed with a packet having a sequence number (Seq No. 100) from the calling party to the called party, and the sequence numbers (Seq Nos. 101, 102, 103, 104 and the like) are then added in order from the calling party to the called party and packets containing image data (0), (1), (2), (3) and the like corresponding to at least one line are sequentially transmitted to the called party at the transmission speed.

A packet (Seq No. x) containing image data (x) in a last line is transmitted, and furthermore, a packet (Seq No. y) containing a post message instruction is transmitted and a packet (Seq No. z) containing a post message instruction is then received from the called party. Thus, the serial facsimile transmission processing is ended.

In the meantime, every time the packet transmitted from the calling party is received at the called party, the sequence number is checked. If the packet loss is not detected, there is executed a processing for storing image data fetched from the primary area 732 of the packet in the image memory 131 in order of the sequence number, and furthermore, overwriting the image data in the normally received packet as complementation data to the complementation data memory 112.

For example, as is illustrated in FIG. 6, when the respective packets having the sequence numbers (Seq No. 101) and (Seq No. 102) are received, the image data (0) and (1) in the respective received packets are stored in the image memory 131, and the image data (1) in a last normally received packet are stored in the complementation data memory 112 and the packet having the sequence number (Seq No. 103) is not then received due to a communication failure (which is shown in an mark of "X" in the drawing), it is detected that the packet having the sequence number (Seq No. 103) is lost in the packet loss detecting portion 111.

Based on the result of the detection of the loss packet, the complementing control portion 113 embeds the image data (1) in the received packet having the last sequence number (Seq No. 102), and received normally and stored in the complementation data memory 112 in place of the loss packet, and a processing for linking and coupling image data [(4) to (X)] in next respective packets received normally is then executed continuously.

By the receipt processing, image data obtained by embedding and complementing the image data (1) in the packet having the sequence number (Seq No. 102) and received normally in place of the image data (2) in the loss packet having the sequence number (Seq No. 103) are acquired over the image memory 131.

When the image data are printed and output by the recording portion 15, the image data in the loss packet are complemented with image data in an adjacent line which are received normally. Therefore, there is taken a configuration in which an image in a complemented line is similar to an image in an adjacent line.

In many cases in which a received image is a line drawing, generally, each line has a small difference from a last line. Therefore, it is possible to suppress a breakage of the received image to be output by carrying out a complementation with data in the last line when a single packet includes image data on a line unit.

Accordingly, the example is useful for the case in which a line lacking complementation received image is to be close to an original image (a request for precision to the received image is not great).

As a variant of the example, it is also possible to employ a structure in which image data in each packet received normally are subjected to an image processing to generate complementing data in place of the complementation of the image data in the loss packet with image data in a last normally received packet.

As a specific example, it is possible to propose a structure in which there is provided generating means (image processing means) for generating complementation data based on image data included in respective packets received normally before and after a lost packet, and the complementation data memory 112 is caused to hold the complementation data thus generated and the complementing control portion 113 uses the complementation data to carry out a complementation processing.

SECOND EXAMPLE

A facsimile apparatus (referred to as 10B for convenience) according to a second example is constituted by the functional block shown in FIG. 2. In the system control portion 11, the complementation data memory 112 holds data (hereinafter referred to as decoding abnormal data) which may not be normally decoded as complementation data for complementing image data (loss image data) in a loss packet and the complementing control portion 113 uses the decoding abnormal data as the complementation data, thereby carrying out a complementation processing over the loss image data.

Figure 7:
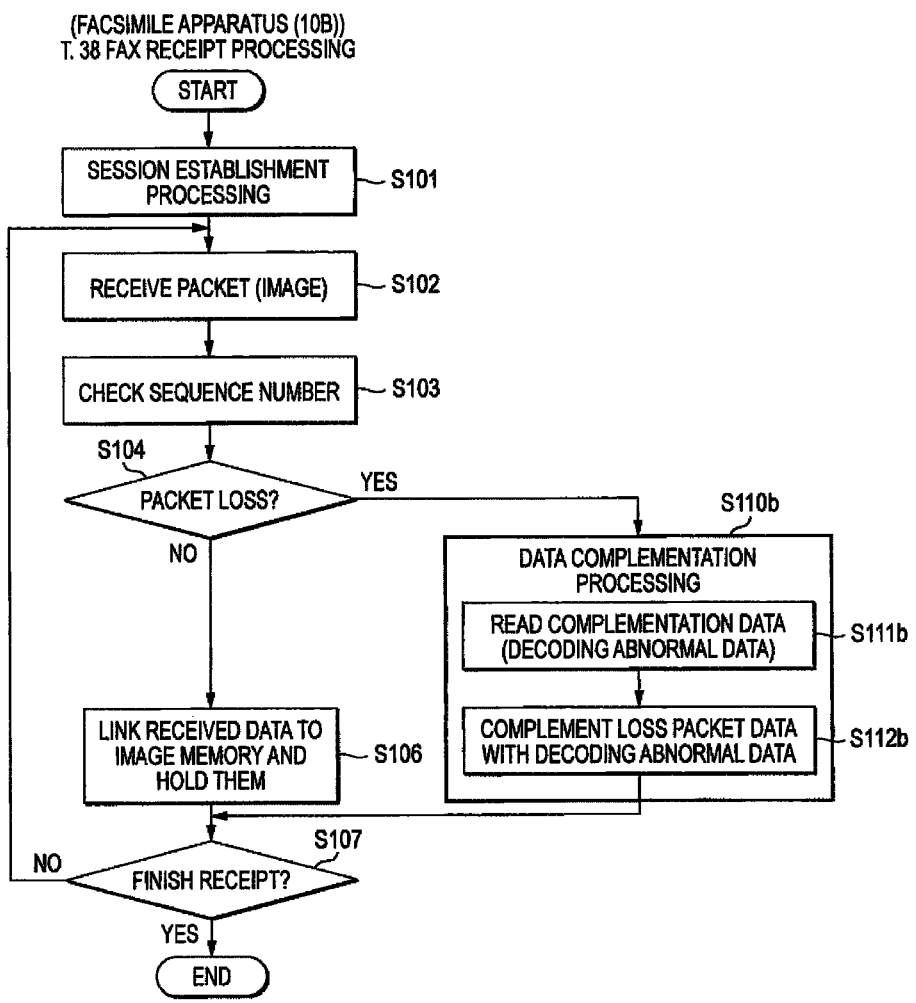
FIG. 7 is a flowchart showing a T.38 FAX receipt processing operation according to a second example.

FIG. 7 is a flowchart showing a FAX receiving operation based on a control procedure using a T.38 method in the facsimile apparatus 10B according to the example.

In FIG. 7, the same processing steps as those in the flowchart (see FIG. 5) according to the first example have the same reference numerals.

Figures 8A, 8B:
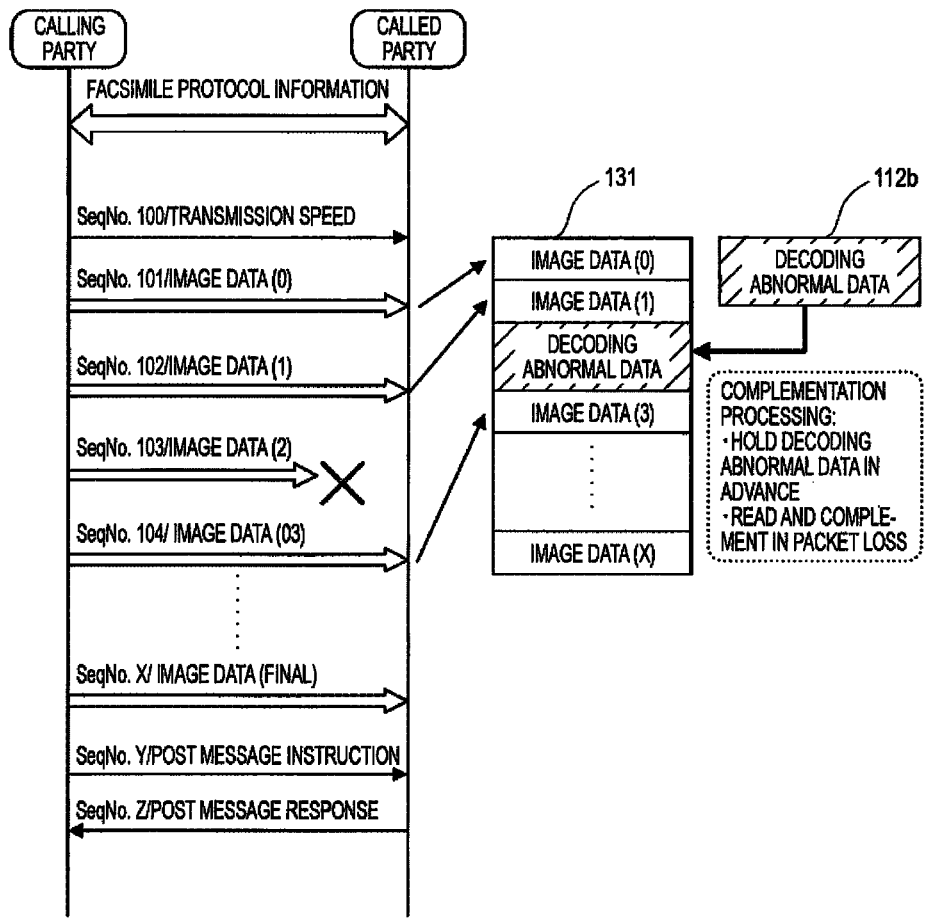
FIG. 8 is a diagram showing a data complementation processing image in a packet loss according to the second example.

In an execution of the FAX receiving operation, the complementation data memory 112 prestores, as the complementing data, decoding abnormal data having a structure illustrated in FIG. 8B, for example.

As shown in FIG. 7, in the facsimile apparatus 10B according to the example, when a session with a partner terminal (a calling party) is established via a calling set processing through a communication of a call connecting procedure signal using a T.38 method (Step S101) and a transition to a phase for receiving image data is then made, a sequence number is checked to detect whether a packet loss is caused or not (Steps S103 and S104) every time a packet is received (Step S102). If the packet is normally received (Step S104 NO), there is carried out a processing for storing image data in the received packet in the image memory 131 in order of the sequence number (Step S106).

In the meantime, if the packet loss is detected from a result of a continuity check for each sequence number in each packet received at the Step S102 (Step S104 YES), the complementing control portion 113 executes a data complementation processing (Step S110b).

In the data complementation processing, the complementing control portion 113 reads decoding abnormal data held as complementation data in the complementation data memory 112 (Step S111b) and a part corresponding to an image in the loss packet in the image memory 131 is complemented with the decoding abnormal data (Step S112b).

More specifically, there is carried out a processing for filling an area where image data (loss image data) in the loss packet in the image memory 131 are to enter with the decoding abnormal data.

Then, the processing proceeds to Step S107. If it is decided that the image receipt is not ended (Step S107 NO), the processing in and after the Step S102 is executed. If it is decided that the image receipt is ended (Step S107 YES), the serial FAX receipt processing is ended.

FIG. 8 is a diagram showing a packet-loss data complementation processing image related to a control sequence of the facsimile apparatus 10B according to the example.

As shown in FIG. 8A, in the example, the complementation data memory 112 holds, as complementation data, decoding abnormal data having a data content which may not be decoded previously. Examples of the complementation data include complementation data having a value shown in FIG. 8B.

A pattern of a packet transmission on a transmitting side and a packet loss on a receiving side in a control sequence shown on a left side in FIG. 8A is the same as that of the control sequence (see FIG. 6) according to the first example.

In the example, at the receiving side, there is carried out a processing for simply checking a sequence number every time a packet to be transmitted on the transmitting side is received, and storing image data fetched from the primary area 732 of the packet in the image memory 131 in order of the sequence number if the packet loss is not detected (image data of a packet received normally are not overwritten as complementation data).

For example, as is illustrated in FIG. 8, in the case in which packets having sequence numbers (Seq No. 101) and (Seq No. 102) are received, image data (0) and (1) in the respective received packets are stored in the image memory 131, and thereafter, a packet having a sequence number (Seq No. 103) is not received due to a communication failure (shown in a mark of "X" in the drawing), the packet loss detecting portion 111 detects that the packet having the sequence number (Seq No. 103) is lost.

Based on a result of the detection of the loss packet, the complementing control portion 113 embeds the decoding abnormal data stored in the complementation data memory 112 in place of the loss packet, and subsequently, there is continuously carried out a processing for linking and synthesizing image data [(4) to (X)] in next packets received normally.

Image data in which prepared decoding abnormal data are embedded and complemented are obtained in place of the image data (2) in the loss packet having the sequence number (Seq No. 103) over the image memory 131 through the receipt processing.

When the image data are printed and output through a recording portion, the image data in the loss packet are complemented with the prepared decoding abnormal data. Therefore, there is formed an image having a remarkably different image configuration from an adjacent image which is received normally based on the complemented decoding abnormal data (which has a conspicuous breakage feeling).

Accordingly, the example is useful for the case in which the complemented and received image is kept away from an original image as greatly as possible and is thus made conspicuous (a request for precision to the received image is great).

Moreover, the example is not restricted to an application in a receipt of a packet containing image data on a line unit as in the first example but may also be applied to a receipt of a packet containing image data having a data volume which is smaller than a part corresponding to a line.

THIRD EXAMPLE

Figure 9:
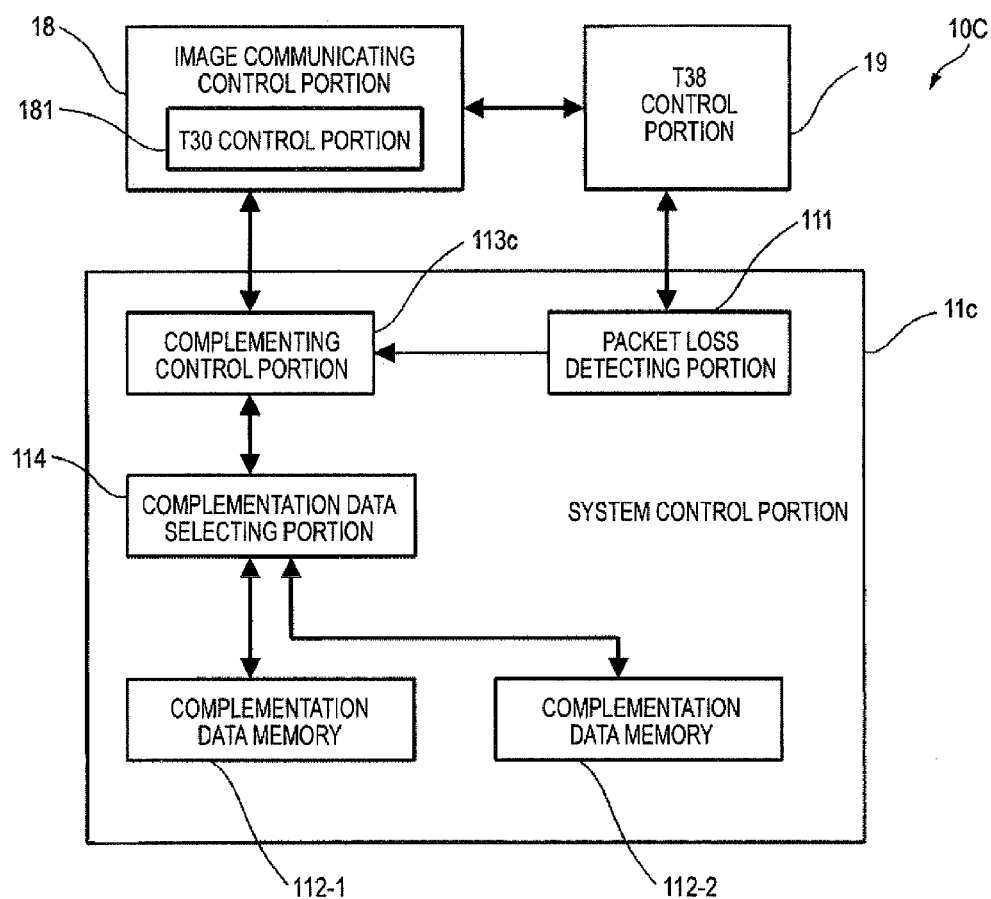
FIG. 9 is a diagram showing a functional structure of a system control portion of a facsimile apparatus according to a third example.

FIG. 9 is a block diagram showing a functional structure of a system control portion 11c in a facsimile apparatus 10C according to a third example.

In the facsimile apparatus 10C according to the example, portions other than portions shown in FIG. 9 are equivalent to those in the facsimile apparatus 10 according to the first example and the facsimile apparatus 10B according to the second example. In the system control portion 11c, moreover, functional blocks which are common to those in the first and second examples have the same reference numerals.

As shown in FIG. 9, in the facsimile apparatus 10C according to the example, the system control portion 11c newly includes, as packet-loss data complementing control function elements, a first complementation data memory 112-1 for holding first complementation data, a second complementation data memory 112-2 for holding second complementation data and a complementation data selecting portion 114 for selecting either the first complementation data or the second complementation data as complementation data.

A complementing control portion 113c carries out a data complementing control in a packet loss by using either the first or second complementation data selected by the complementation data selecting portion 114.

For example, the image data in the normally received packet described in the first example may be used as the first complementation data and the decoding abnormal data described in the second example may be used as the second complementation data.

Moreover, the complementation data selecting portion 114 has, as a data selecting function, a function for detecting a structure of the image data in the normally received packet, for example, and it is possible to employ a structure in which the first complementation data are selected when image data are contained in a single packet on a line unit and the second complementation data are selected in the other cases based on a structure of image data in a packet recognized by the function.

Furthermore, it is also possible to employ a structure in which there is provided designating means for designating a type of information to be used in a loss data complementation processing through the operating/displaying portion 17 (for example, normally received image data or decoding abnormal data) and the complementation data selecting portion 114 has a function for selecting complementation data of the type designated by the designating means.

For convenience, description will be given on the assumption of a structure in which the complementation data selecting portion 114 has a function for selecting complementation data of a type designated by a user.

Figure 10:
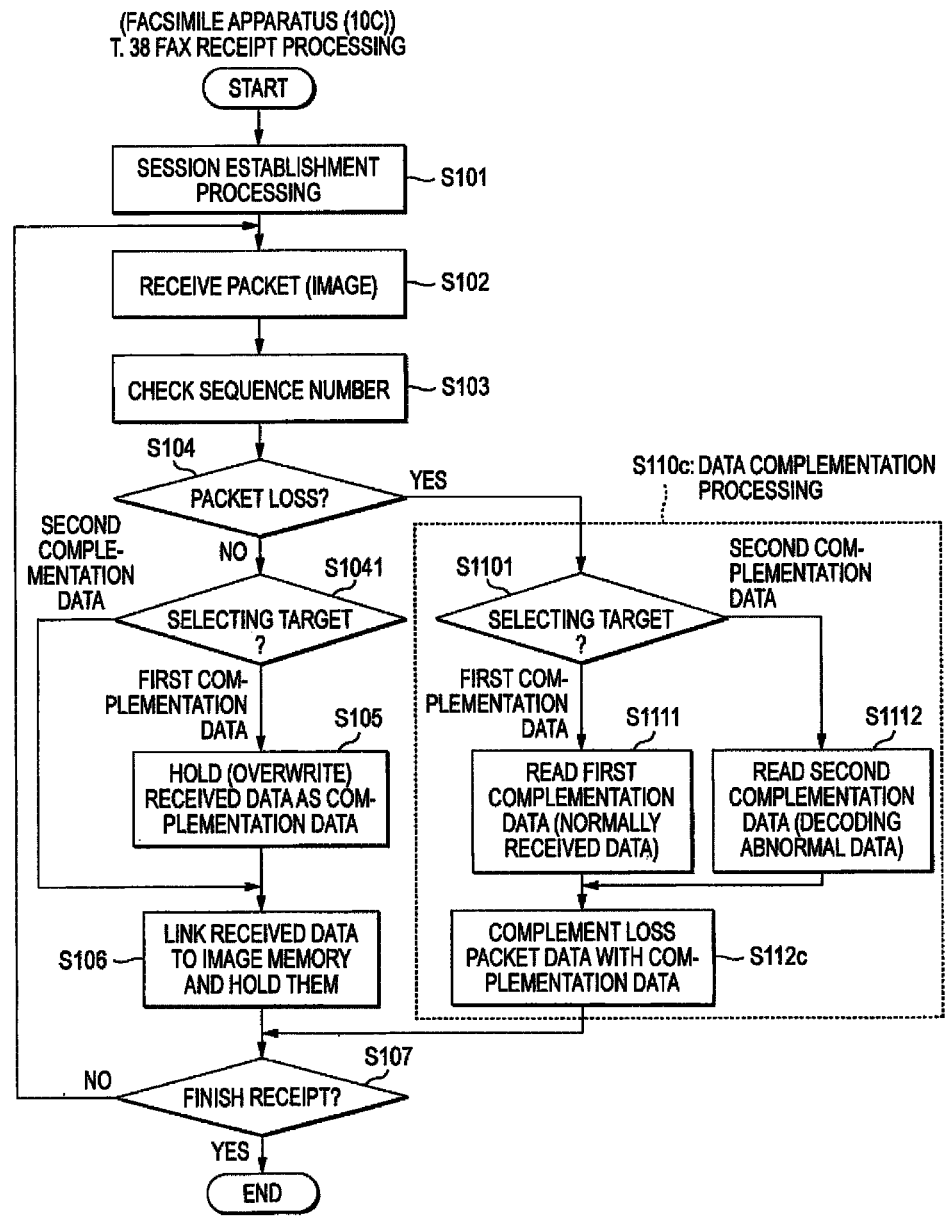
FIG. 10 is a flowchart showing a T.38 FAX receipt processing operation according to the third example.

FIG. 10 is a flowchart showing a FAX receiving operation based on a control procedure using the T.38 method in the facsimile apparatus 10C according to the example.

In FIG. 10, the same processing steps as those in the flowcharts (see FIGS. 5 and 7) according to the first and second examples have the same reference numerals.

In order to carry out the FAX receiving operation, the complementation data memory 112-2 prestores the decoding abnormal data shown in FIG. 8B, for example.

On the other hand, any data are not transferred to the complementation data memory 112-1 in an initial stage. When a FAX receipt (a receiving phase of image data) is then started, data on a line unit which are contained in a normally received packet are transferred thereto.

In the facsimile apparatus 10C according to the example, as shown in FIG. 10, when a session with a partner terminal (a calling party) is established via a calling set processing through a communication of a call connecting procedure signal using a T.38 method (Step S101) and a transition to a phase for receiving image data from the partner terminal is made, the packet loss detecting portion 111 checks a sequence number (Step S103) and carries out a processing for detecting whether a packet loss is caused or not (Step S104) every time a packet containing image data is received (Step S102).

If the packet loss is not detected (Step S104 NO), the complementation data selecting portion 114 checks whether a type of complementation data set by a user is first complementation data or second complementation data (Step S1041).

If the type of the complementation data is the first complementation data ("first complementation data" in the Step S1041), the complementing control portion 113c stores the image data in the normally received packet in the complementation data memory 112-1 (Step S105) and the processing proceeds to Step S106.

If the type of the complementation data is the second complementation data ("second complementation data" in the Step S1041), moreover, the step S105 is not executed but the processing proceeds to the Step S106.

After the image data in the normally received packet are stored in the image memory 131 in order of a sequence number (Step S106), it is monitored whether the image receipt is ended or not (Step S107).

If the image receipt is not ended (Step S107 NO), there is executed the processing for receiving a next packet (Step S102) and checking the sequence number to detect whether the packet loss is caused or not (Steps S103 and S104).

In that case, if the packet is normally received (Step S104 NO) and the type of the complementation data set by the user is the first complementation data ("first complementation data" in the Step S1041), there is continuously executed the processing for storing, in the complementation data memory 112-1, the image data in the received packet and storing the image data in the image memory 131 in order of the sequence number (Steps S105 and S106).

In the meantime, if the packet loss is detected based on a result of the check of each sequence number in each packet received at the Step S102 (Step 5104 YES), a transition to a data complementation processing (Step S110c) is made.

When the transition to the loss packet complementation processing (Step S110c) is made, the complementation data selecting portion 114 first checks whether the type of the complementation data designated by the user is the first complementation data or the second complementation data (Step S1101).

If the type of the complementation data is the first complementation data ("first complementation data" in the Step S1101), the complementation data selecting portion 114 reads the complementation data stored in the complementation data memory 112-1 (the image data in the normally received packet) (Step S1111) and transfers the same complementation data to the complementing control portion 113c.

The complementing control portion 113c complements a part corresponding to the image data in the loss packet in the image memory 131 with the normally received image data thus read (Step S112c).

On the other hand, if the type of the complementation data is the second complementation data ("second complementation data" in the Step S1101), the complementation data selecting portion 114 reads the complementation data (the decoding abnormal data) stored in the complementation data memory 112-2 (Step S1112) and transfers the same complementation data to the complementing control portion 113c.

The complementing control portion 113c complements a part corresponding to the image data in the loss packet in the image memory 131 with the decoding abnormal data thus read (Step S112c).

After the complementation processing in the Step S112c is completed, the processing proceeds to the Step S107. If it is decided that the image receipt is not ended (through a non-receipt of a post message instruction) (Step S107 NO), the processing in and after the Step S102 is executed. If it is decided that the image receipt is ended (Step S107 YES), the serial FAX receipt processing is ended.

In the example, with the structure in which the normally received data or the abnormal decoding data are selectively used as the complementation data, it is possible to execute the data complementation processing in the packet loss depending on an expectation of either the case in which a degree of a breakage of a received image to be output is reduced or the case in which a lacking part of the received image is clearly known.

FOURTH EXAMPLE

Figure 11:
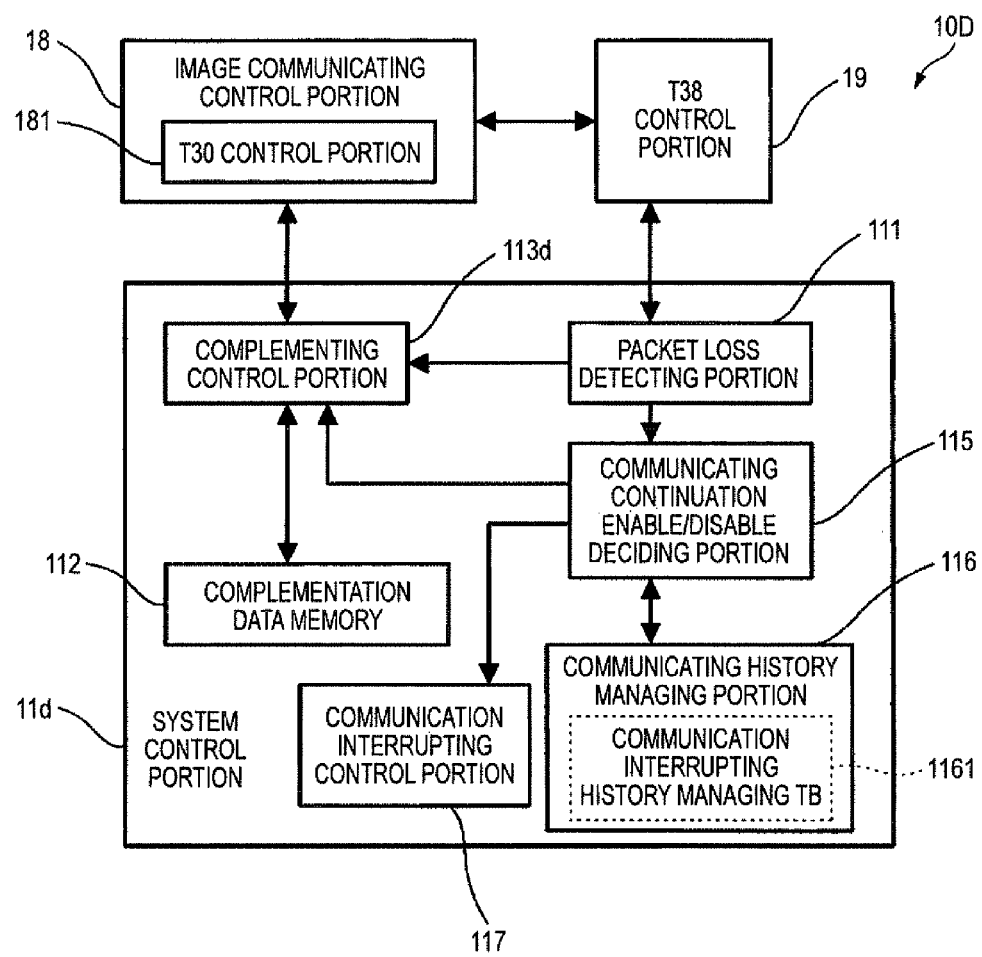
FIG. 11 is a diagram showing a functional structure of a system control portion in a facsimile apparatus according to a fourth example.

FIG. 11 is a block diagram showing a functional structure of a system control portion 11d in a facsimile apparatus 10D according to a fourth example.

In the facsimile apparatus 10D according to the example, portions other than portions shown in FIG. 11 are equivalent to those of the facsimile apparatuses 10, 10B and 10C according to the first, second and third examples. In the system control portion 11d, moreover, functional blocks which are common to those in each of the first, second and third examples have the same reference numerals.

As shown in FIG. 11, in the facsimile apparatus 10D according to the example, the system control portion 11d includes, as packet-loss data complementing control function elements, a packet loss detecting portion 111 and a complementation data memory 112 which are equivalent to those in the first example, and furthermore, a communicating continuation enable/disable deciding portion 115, a communicating history managing portion 116 and a communication interrupting control portion 117.

When a packet loss is detected by the packet loss detecting portion 111, the communicating continuation enable/disable deciding portion 115 decides whether a communication is continued (the loss packet is complemented by using complementation data stored in the complementation data memory 112) or a data complementation processing is not executed but the communication is interrupted. If it is decided that the communication is continued, a notice of the purport is given to a complementing control portion 113d. If it is decided that the communication is interrupted, a notice of the purport is given to the communication interrupting control portion 117.

The communicating history managing portion 116 particularly manages information about a communication interrupting history as history information about a communication with a partner terminal by using a communication interrupting history managing table (TB) 1161.

FIG. 12 is a table showing an example of the communication interrupting history managing table 1161 which holds information about date and time that a communication is interrupted and the number of times of the interruption occurrence in relation to the communication interrupted due to the packet loss corresponding to destination information (an IP address) of a partner terminal.

Reference is made to the communication interrupting history information managed by the communicating history managing portion 116 using the communication interrupting history managing table 1161 as deciding index information for the continuation or interruption of the communication through the communicating continuation enable/disable deciding portion 115 in the detection of the packet loss.

Consequently, the communicating continuation enable/disable deciding portion 115 decides that "the communication is interrupted" if an IP address of a partner is not recorded in the communication interrupting history managing table 1161 in the detection of the packet loss.

In that case, the communicating history managing portion 116 records the communication interrupting history information in the communication interrupting history managing table 1161 corresponding to an IP address of a partner terminal.

Moreover, the communicating continuation enable/disable deciding portion 115 decides that "the communication is continued" if the communication interrupting history information corresponding to the IP address of the partner is recorded in the communication interrupting history managing table 1161 in the detection of the packet loss.

In many cases, it is assumed that the cause for the occurrence of the packet loss is greatly influenced by quality of a line to be a communicating path.

In case of the same communicating partner, the same communicating path is often utilized. For this reason, there is a high possibility that the packet loss might occur again with a partner for whom the packet loss is caused.

Accordingly, the receipt may not be carried out at all through only the decision of the communicating interruption due to the packet loss. For this reason, the receipt is continued at second and succeeding times.

The communicating continuation enable/disable deciding portion 115 may accept to set a threshold and may decide that "the communication is continued" if the number of times of the interruption occurrence exceeds the threshold [may decide that "the communication is interrupted" if the number of times of the interruption occurrence is equal to or smaller than the threshold].

The communication interrupting control portion 117 carries out a control for interrupting the communication through a decision that the communication is interrupted by the communicating continuation enable/disable deciding portion 115 (upon receipt of a notice indicating that the communication is interrupted from the communicating continuation enable/disable deciding portion 115).

The complementing control portion 113d executes a loss data complementation processing using complementation data in the complementation data memory 112 through the decision that the communication is continued by the communicating continuation enable/disable deciding portion 115 (upon receipt of a notice indicating that the communication is continued from the communicating continuation enable/disable deciding portion 115).

A FAX receiving operation based on a control procedure using a T.38 method in the facsimile apparatus 10D according to the example will be described in detail with reference to a flowchart of FIG. 13.

Figure 13:
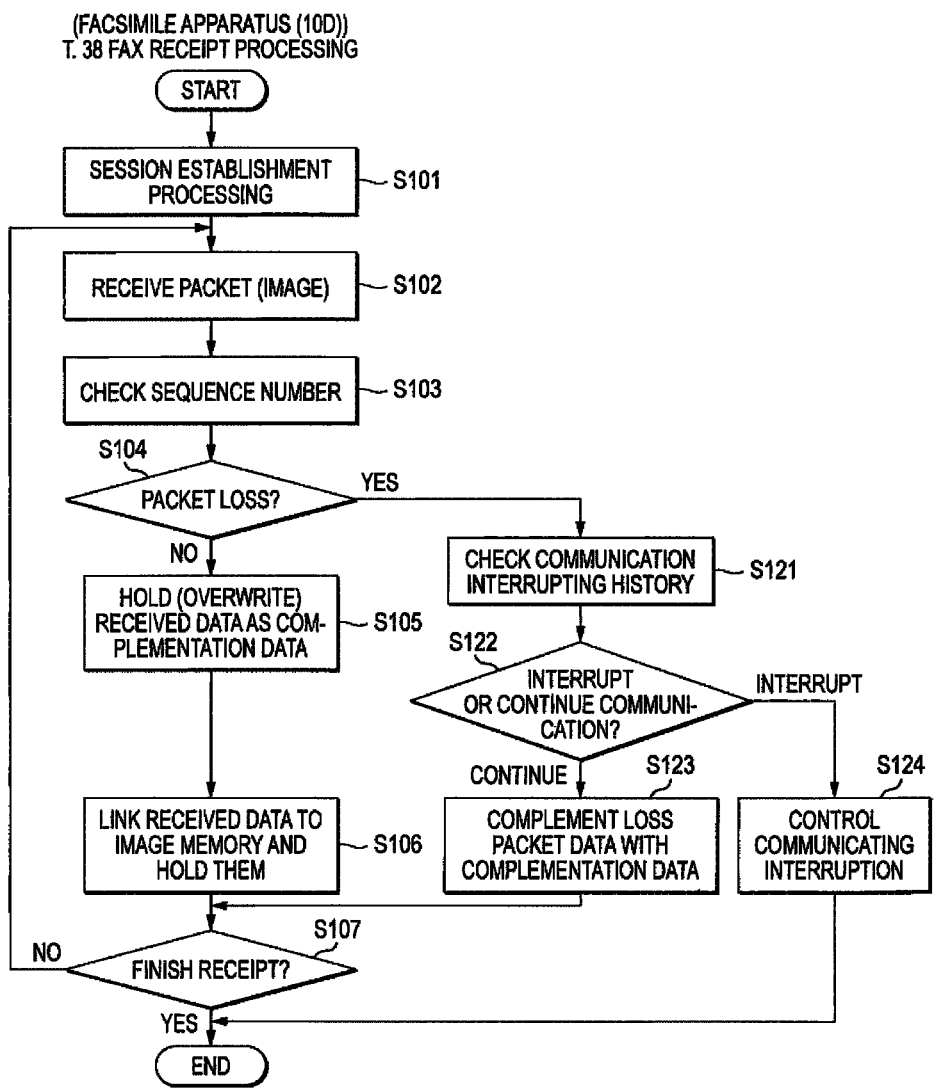
FIG. 13 is a flowchart showing a T.38 FAX receipt processing operation according to the fourth example.

Also in FIG. 13, the same processing steps as those in the flowcharts according to the first and second examples (see FIGS. 5 and 7) have the same reference numerals.

In the facsimile apparatus 10D according to the example, as shown in FIG. 13, when a session with a partner terminal (a calling party) is established via a calling set processing through a communication of a call connecting procedure signal using the T.38 method (Step S101) and a transition to a phase for receiving image data from the partner terminal is made, the packet loss detecting portion 111 checks a sequence number (Step S103) and carries out a processing for detecting whether a packet loss is caused or not (Step S104) every time a packet containing image data is received (Step S102).

If the packet loss is not detected (Step S104 NO), the image data in the normally received packet are stored in the complementation data memory 112 (Step S105).

After the image data in the normally received packet are stored in the image memory 131 in order of a sequence number (Step S106), subsequently, it is monitored whether the image receipt is ended or not (Step S107).

If the image receipt is not ended (Step S107 NO), there is continuously executed the processing for receiving a next packet (Step S102) and checking the sequence number to detect whether the packet loss is caused or not (Steps S103 and S104), storing, in the complementation data memory 112, the image data in the received packet and storing the image data in the image memory 131 in order of the sequence number (Steps S105 and S106) if the packet is normally received (Step S104 NO).

In the meantime, if the packet loss is detected based on a result of the check of the sequence number in each packet received at the Step S102 (Step S104 YES), the communicating continuation enable/disable deciding portion 115 checks a communication interrupting history corresponding to destination information about a partner which is carrying out a communication in the communication interrupting history managing table 1161 (S121) and decides whether the communication is continued or interrupted from the result of the check (Step S122).

If information about the number of times of the communicating interruption is recorded in the communication interrupting history managing table 1161 corresponding to the destination information about the partner which is carrying out the communication (if the number of times of the communicating interruption is equal to or greater than "one" or exceeds a threshold, for example), it is decided that the communication is continued ("continue" in Step S122) and a notice of the purport is given to the complementing control portion 113*d*.

If the destination information about the partner is not recorded (or the number of times of the communicating interruption recorded corresponding to the destination information about the partner is equal to or smaller than the threshold), moreover, it is decided that the communication is interrupted ("interrupt" in the Step S122) and a notice of the purport is given to the communication interrupting control portion 117.

The complementing control portion 113*d* executes a processing for receiving a notice of the purport to continue the communication from the communicating continuation enable/disable deciding portion 115, thereby reading the complementation data stored in the complementation data memory 112 (the image data in the normally received packet) and complementing a part corresponding to the image data (loss data) in the loss packet in the image memory 131 with the normally received image data thus read.

More specifically, there is executed a processing for embedding the normally received image data in an area (at least one line) where the loss data in the image memory 131 are to enter, thereby eliminating an image lack.

Then, the processing proceeds to the Step S107. If it is decided that the image receipt is not ended (through a non-receipt of a post message instruction) (Step S107 NO), the processing in and after the Step S102 is executed. If it is decided that the image receipt is ended (Step S107 YES), the serial FAX receipt processing is ended.

On the other hand, the communication interrupting control portion 117 receives a notice of the purport to interrupt the communication from the communicating continuation enable/disable deciding portion 115, thereby giving an instruction to the call connecting control potion 21 to execute a call disconnecting control and to thus interrupt the communication (Step S124).

In the example, the communication interrupting history with the communicating partner is checked to selectively control whether the data complementation or the communicating interruption is carried out in the packet loss. Therefore, it is possible to perform an application which fulfills the purpose of use.

Although the image data in the normally received packet are used as the complementation data in the example, it is also possible to use the decoding abnormal data described in the second example.

Alternatively, it is also possible to employ a structure in which the first complementation data and the second complementation data are selectively utilized depending on a situation as described in the third example.

Moreover, it is also possible to employ a structure in which a setting function for setting whether the communication is interrupted or continued in the packet loss is provided as the function for deciding the communicating continuation or the communicating interruption through the communicating continuation enable/disable deciding portion 115 and a user decides whether the communication is continued or interrupted depending on a content (an application type : a communicating continuation or a communicating interruption) set by operating the operating/displaying portion 17 utilizing the setting function.

Although there has been described the structure in which the communication might be continued (the loss data might be complemented with the complementation data) in the packet loss in the example, furthermore, it is also possible to employ a structure in which only the control of the communicating interruption is executed in the detection of the packet (a structure which has neither the communicating continuation enable/disable deciding portion 115 nor the communicating history managing portion 116).

According to the structure in which the communication is interrupted in the packet loss, it is also possible to cause the transmitting side to reliably know an abnormality and to expect a retransmitting operation from the transmitting side.

In addition, the invention is not restricted to the examples described above and shown in the drawings but may be variously changed and executed without departing from the gist thereof.

Although the loss information complementing control program is mounted on the facsimile apparatus constituted by a computer and the computer is caused to function as the loss detecting means for detecting a loss of a packet transmitted with image information contained on a line unit, the complementing information holding means for holding complementing information for complementing the image information contained in the lost packet, and the complementation processing means for carrying out a complementation processing over the image information contained in the lost packet with the complementing information held by the complementing information holding means when the loss of the packet is detected by the loss detecting means in a stage for receiving the image information in facsimile information in each of the examples, for instance, it is also possible to store the same program in a storage medium such as a CDROM so as to be offered.

The invention may be applied to an image communicating apparatus for complementing image information included in a lost packet without depending on a retransmission in an image communication for containing image information in a packet based on a T.38 method protocol, thereby transmitting the packet via an IP network.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments are chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image communicating apparatus comprising:
a communicating control unit that controls an internet facsimile communication for transmitting/receiving control information and a packet containing image information based on a T.38 protocol;

a loss detecting unit that detects a loss of the packet transmitted from a transmitting side in a stage for receiving the image information through the packet based on the T.38 protocol;

a complementing information holding unit that holds, at a receiving side, complementing information for complementing the image information contained in the lost packet;

a first complementing information holding unit that holds the image information contained in a normally received packet as first complementing information;

a second complementing information holding unit that holds decoding abnormal information which is not decoded normally as second complementing information;

a complementing information selecting unit that selects either the first complementing information or the second complementing information as complementing information; and a complementation processing unit that complements the image information contained in the lost packet with the complementing information held by the complementing information holding unit if the loss of the packet is detected by the loss detecting unit, wherein the complementation processing unit complements the first or second complementing information which is selected by the complementing information selecting unit.

2. The image communicating apparatus according to claim 1 further comprising:

a designating unit that designates a type of the complementing information for complementing, wherein the complementing information selecting unit selects the complementing information of the type designated by the designating unit from the first and second complementing information.

3. An image communicating apparatus comprising:

a communicating control unit that controls an internet facsimile communication for transmitting/receiving control information and a packet containing image information based on a T.38 protocol;

a loss detecting unit that detects a loss of the packet transmitted from a transmitting side in a stage for receiving the image information through the packet based on the T.38 protocol;

a communication interrupting control unit that controls a interruption of the communication if the loss of the packet is detected by the loss detecting unit;

a complementing information holding unit that holds complementing information for complementing the image information contained in the lost packet;

a deciding unit that decides whether the communication is interrupted or continued if the loss of the packet is detected by the loss detecting unit; and a complementation processing unit that complements the image information contained in the lost packet with the complementing information held by the complementing information holding unit if it is decided that the communication is continued by the deciding unit, wherein the communication interrupting control unit controls an interruption of the communication if it is decided that the communication is interrupted by the deciding unit.

4. The image communicating apparatus according to claim 3 further comprising:

a managing unit that manages a communication interrupting history corresponding to destination information to be connected, wherein the deciding unit makes a decision based on the communication interrupting history managed by the managing unit corresponding to destination information of a transmitting source of the packet.

5. The image communicating apparatus according to claim 3 further comprising:

a setting unit that sets whether the communication is interrupted or continued in the packet loss, wherein the deciding unit decides whether the communication is interrupted or continued depending on the setting operation of the setting unit.

* * * * *